Patented July 25, 1939

2,166,997

UNITED STATES PATENT OFFICE 2,166,997

PROCESS OF DISTILLING ORGANIC ACID ANHYDRIDE

Josef Lösch, Knapsack, near Cologne-on-the-Rhine, Germany, assignor to Aktiengesellschaft für Stickstoffduenger, Knapsack, near Cologne-on-the-Rhine, Germany No Drawing. Application November 8, 1934, Serial No. 752,111. In Germany June 9, 1934

6 Claims. (Cl. 202—46)

The present invention relates to a process of setting free an organic acid anhydride from its liquid mixture with water and with the corresponding organic acid.

In the co-pending U. S. application Serial No. 50,002, filed November 15, 1935 there has been described a process of preparing the anhydride of an organic acid according to which the liquid mixture is obtained containing the acid anhydride, water and various quantities of the acid corresponding to the anhydride.

If the water, which has a harmful effect on the formation of the anhydride, is not eliminated during the oxidation, it has to be separated from the anhydride as soon as the oxidation is complete. If this separation is to be by distillation, it must be remembered that the application of one of the usual processes of distillation under normal conditions causes considerable loss of anhydride, this being due to the fact that the anhydride is particularly capable of reacting with water at the raised temperatures which are applied during the distillation.

It has been found, however, that the water can be distilled even under ordinary pressure from the mixture consisting, for instance, of the anhydride, water and the acid corresponding with the anhydride, without having to fear a considerable loss of anhydride, if the distillation is performed under such conditions that the readily volatile portions, such as water and a part of the acid, are caused to evaporate so readily that the water has no opportunity of hydrolyzing the anhydride. This can be attained by various methods.

For instance the liquid mixture is caused to run into a vigorous current of hot, if desired superheated, vapor of the organic acid which corresponds with the anhydride to be isolated. The temperature of these vapors is preferably kept at a point at which the water can evaporate as rapidly as possible. A fine distribution of the mixture, for instance by means of a nozzle, promotes the rapid vaporization of the aforesaid readily volatile portions of water and acid. The mixture may, if desired, be finely distributed by spraying it with the aid of a current of inert gases which may be heated to such a temperature that the vaporization of the more readily volatile portions is still further promoted.

The rapid vaporization of water and acid may be still further increased if the mixture entering into the hot zone is received on heated stationary or moving surfaces which are kept at such a temperature that the entire quantity of water and a part of the acid immediately evaporates.

If the process is performed in the manner herein described, it is possible to separate from the water more than 92 per cent. of the anhydride originally contained in the mixture. As the process may be performed under ordinary pressure, the invention is an essential industrial progress in comparison with the hitherto known processes because the apparatus is considerably simplified by elimination of vacuum pump and purifying filters. A considerable economical improvement is that the distillation is considerably cheaper than hitherto owing to the fact that the condenser and the dephlegmators are reduced in size and the apparatus required for producing the vacuum are avoided.

If, nevertheless, it is desired to operate under reduced pressure, it is possible, also during this method of operating, advantageously to separate the water by applying the above described steps and to increase the yield of anhydride to over 95 per cent., approaching, indeed, the theoretical yield, for instance, when the particularly readily hydrolyzable acetic anhydride is being produced.

The present process also possesses great advantages over the known processes wherein the water is separated from the organic acid anhydride by an azeotropic distillation. In the present process no heterogeneous solvent, which increases the cost owing to unavoidable loss, is added; the economy due to this is enhanced by the fact that the products frequently remain mixed with the solvent to such an extent that further purification is necessary. This applies particularly to acetic anhydride and to acetic acid which are required to have a high degree of purity.

The following examples serve to illustrate the invention, but they are not intended to limit it thereto, the parts being by weight if not stated otherwise:

(1) 500 parts of glacial acetic acid are heated to boiling in the still of a distilling column and the entire column is brought to the temperature of the boiling acetic acid. Every hour 250 parts of a liquid mixture which is composed of 40 per cent. of acetic anhydride, 52 per cent. of acetic acid and 8 per cent. of water, and may be obtained, for instance, by treating 400 parts of liquid acetaldehyde with oxygen in the presence of 70 parts of acetic acid and of 2 parts of copper metal and 1 part of cobalt metal, are sprayed in, in the form of a fine spray, through several fine spraying nozzles, preferably in the centre of the column. If the supply of heat and the dephlegmation are properly adjusted, acetic acid free from anhydride together with 8–10 per cent. of water distils. The acetic acid may directly be concentrated again by a partial condensation in a second column. As far as necessary it flows back again into the still. The mixture of acetic acid and acetic anhydride which is collected in the still is separated in known manner by a fractional distillation. 81 per cent. of the anhydride contained in the mixture is obtained.

(2) The method of operating is the same as that described in Example 1. The mixture is, however, sprayed against a heated body fitted in the column at the level of the nozzles and kept at 300° C. 83 per cent. of the anhydride contained in the mixture is obtained.

(3) The method of operating is the same as that described in Example 1. However, 100 parts of the mixture are sprayed in per hour; furthermore, at the level of the nozzles there are introduced, every hour, 175 parts of acetic acid vapor previously heated to 300° C. The glacial acetic acid obtained from the distilled dilute acid partly returns into the superheater. 90 per cent. of the anhydride contained in the mixture is obtained.

(4) The method of operating is the same as that described in Example 1. However, 100 parts of a liquid mixture which is composed of 52 per cent. of butyric acid, 40 per cent. of butyric anhydride and 8 per cent. of water, and may be obtained by treating 500 parts of butyraldehyde with oxygen in the presence of 30 parts of butyric acid and of 3 parts of cobalt acetate and 1 part of copper acetate are sprayed in per hour by means of fine spraying nozzles and 175 parts of butyric acid vapor preheated to 200° C., are introduced per hour. 92.5 per cent. of the butyric anhydride contained in the mixture is obtained.

(5) The method of operating is the same as that described in Examples 1-4, but under reduced pressure. 175 parts of a liquid mixture, which is composed of 52 per cent. of acetic acid, 40 per cent. of acetic anhydride and 8 per cent. of water, and may be obtained, for instance, by treating 400 parts of liquid acetaldehyde with oxygen in the presence of 70 parts of acetic acid and of 2 parts of copper metal and 1 part of cobalt metal, are sprayed per hour by means of nozzles into the column and 175 parts of acetic acid vapor, preheated to 200° C., are introduced per hour. Furthermore, the column is under a reduced pressure of 20 mm. mercury. 95.2 per cent. of the anhydride contained in the mixture is obtained.

(6) The method of operating is the same as that described in Example 2. 200 parts of a liquid mixture, which is composed of 35 per cent. of oenanthic anhydride, 26 per cent. of oenanthic acid, 36 per cent. of acetic acid as a solvent and 3 per cent. of water, and may be obtained by treating 304 parts of oenanthic aldehyde of 94 per cent. strength with oxygen in the presence of 200 parts of acetic acid and of 6 parts of cobalt acetate and 4 parts of copper acetate, are sprayed per hour in the form of a fine spray into the centre of the column; opposite the spraying nozzles 150 parts of acetic acid vapor which has been heated to 300° C. are simultaneously introduced, per hour into the column. 80 per cent. of the oenanthic anhydride used are obtained.

(7) The method of operating is the same as that described in Example 5, but under considerably reduced pressure. 100 parts of a mixture which is composed of 11.5 per cent. of crotonic anhydride, 33 per cent. of crotonic acid, 53 per cent. of acetic acid and 2.5 per cent of water, and may be obtained by treating 210 parts of crotonic aldehyde with oxygen in the presence of 300 parts of acetic acid as a solvent and 6 parts of cobalt acetate and 2 parts of copper acetate are sprayed every hour into the column in the form of a fine spray. In the still of the column 250 parts of glacial acetic acid are simultaneously heated to boiling every hour, so that the water contained in the mixture which is sprayed in, immediately vaporizes, besides parts of acetic acid, when entering into the column. The remaining acetic acid runs into the still together with the crotonic acid and the crotonic aldehyde. The crotonic anhydride may then be obtained in a pure condition by a fractional distillation in a yield of 85 per cent. of the anhydride used.

I claim:
1. The process which comprises introducing a liquid mixture containing an organic aliphatic monocarboxylic acid anhydride, water and the acid corresponding with the said anhydride into a vigorous current of hot vapors of a water-soluble monocarboxylic acid having a boiling point higher than that of water and lower than that of said anhydride, thus separating the water and at least the major portion of the acid contained in said mixture from said anhydride by fractional distillation.

2. The process which comprises introducing a liquid mixture containing an organic aliphatic monocarboxylic acid anhydride, water and the acid corresponding with the said anhydride into a vigorous current of hot vapors of said acid, thus separating the water and at least the major portion of the acid contained in said mixture from said anhydride by fractional distillation.

3. The process which comprises introducing in a finely distributed state a liquid mixture containing an organic aliphatic monocarboxylic acid anhydride, water and the acid corresponding with the anhydride into a vigorous current of hot vapors of said acid, thus separating the water and at least the major portion of the acid contained in said mixture from said anhydride by fractional distillation.

4. The process which comprises spraying a liquid mixture containing an organic aliphatic monocarboxylic acid anhydride, water and the acid corresponding with the anhydride by means of a current of inert gases and introducing the spray into a vigorous current of hot vapors of said acid, thus separating the water and at least the major portion of the acid contained in said mixture from said anhydride by fractional distillation.

5. The process which comprises introducing in a finely distributed state a liquid mixture containing an organic aliphatic monocarboxylic acid anhydride, water and the acid corresponding with the anhydride into a still and bringing the mixture in the still into close contact with heated surfaces and a vigorous current of hot vapors of said acid, thus separating the water and at least the major portion of the acid contained in said mixture from said anhydride by fractional distillation.

6. The process which comprises introducing a liquid mixture containing an organic aliphatic monocarboxylic acid anhydride, water and the acid corresponding with the said anhydride into hot vapors of said acid, thus separating the water and at least the major portion of the acid contained in said mixture from said anhydride by fractional distillation.

JOSEF LÖSCH.